Sept. 29, 1959 J. L. ROSENFELD 2,906,887
MAGNETIC CORE SWITCHING CIRCUIT
Filed Jan. 18, 1957
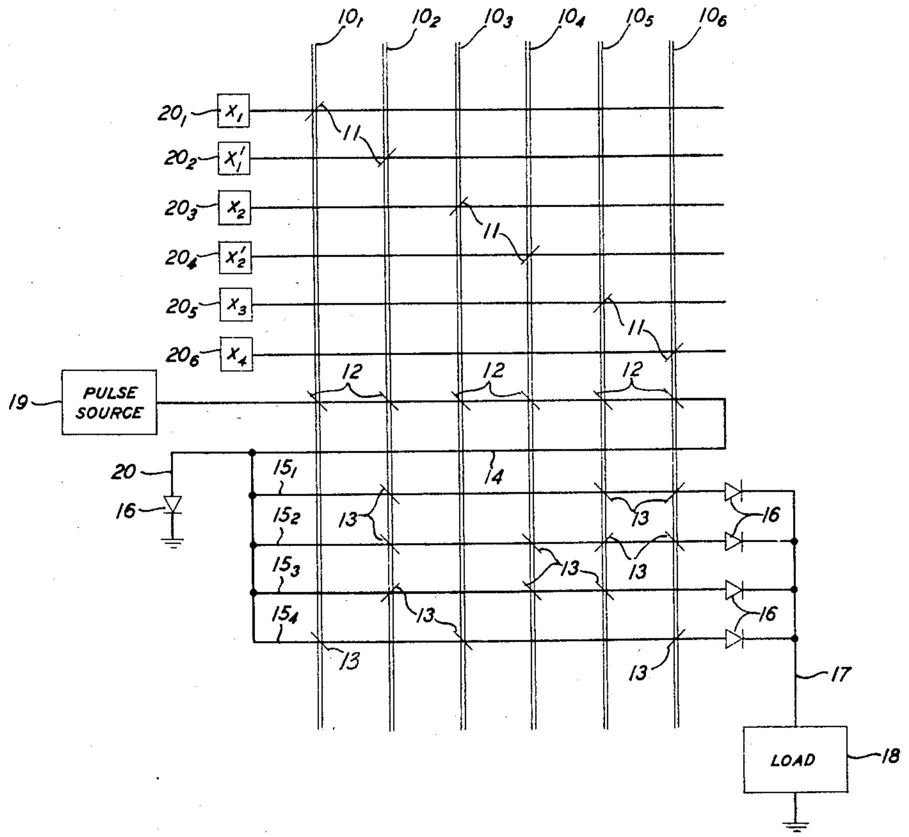
INVENTOR
J. L. ROSENFELD
BY Kenneth B Hamlin
ATTORNEY United States Patent Office 2,906,887

Patented Sept. 29, 1959

2,906,887

MAGNETIC CORE SWITCHING CIRCUIT

Jack L. Rosenfeld, Cambridge, Mass., assignor to Bell Telephone Laboratories, Incorporated, New York, N.Y., a corporation of New York Application January 18, 1957, Serial No. 634,843

15 Claims. (Cl. 307—88)

This invention relates generally to electrical switching circuits and more particularly to electrical switching circuits utilizing magnetic cores as basic switching elements.

Magnetic cores displaying a substantially rectangular hysteresis characteristic have found wide application in computing and data processing systems and the like. Magnetic cores of this type are well-known and, because of the property of remaining in either of two magnetic states to which driven by an applied magnetomotive force, provide a highly advantageous memory element for temporarily or permanently storing bits of binary information.

One known specific application of magnetic cores in which the two-state memory property is effectively utilized is in combinational switching circuits capable of synthesizing logic functions of predetermined variables. Such a switching circuit employing magnetic cores is, for example, described and claimed by R. C. Minnick in Patent 2,779,934, issued January 29, 1957. In accordance with the switching circuit there described, Minnick explains how the functions $$f(x_1, x_2, \ldots x_n) = x_2', x_2' \ldots x_n'$$

and $$f'(x_1, x_2, \ldots x_n) = x_1 + x_2 + \ldots + x_n$$

may be obtained as outputs of single cores. These functions may then be combined in any manner such as to generate any desired function and the outputs corresponding to these functions may then be used to drive succeeding cores in the system. Specifically the logic operation is performed in a circuit comprising a plurality of magnetic cores arranged in a first level, each of the cores having windings inductively coupled thereto and so arranged that an output pulse is generated upon the application of an activating current to all of the cores of the level only if the input information at any first level core bears the relationship of the desired logic function. In the arrangement of the cited application this logic function was the joint denial of the input information at a first level core. A single second level core having a plurality of windings thereon connected respectively to output windings of the first level cores completes the logic operations. The second level core may be, for example, either a joint denial circuit or an OR circuit and thus an output may be generated by the second level core either in the absence of any outputs from the first level cores or in the presence of an output from at least one first level core. In this logic arrangement the logic function is performed solely on the magnetic cores.

As stated in the aforementioned patent, the general object of a circuit of the character described is the attainment of any desired switching function by a circuit employing only magnetic cores and their associated elements. A somewhat similar logic switching circuit also directed to this object is disclosed and claimed in Patent 2,776,380 of F. T. Andrews, Jr., issued January 1, 1957.

In that circuit, cores are set with single variables and connected with the output windings in series-parallel network fashion. This network is then shunted across a load and the activating current itself is applied to the network after having been applied to the activating windings of the cores to perform the conventional switching operation. For input information combinations bearing the relationship $f(x_1, x_2, \ldots x_n) = 1$, a back voltage is induced by the core switching which voltage appears across the series-parallel output winding network preventing the passage of the activating current through the network. As a result, the activating current for this function is applied to the load. For input information combinations for which $f(x_1, x_2, \ldots x_n) = 0$, no back voltage is generated and the activating current passes through one of the branches of the network. In this logic arrangement the logic function is performed in the core output network. Other circuit arrangements employing magnetic cores for performing logic functions are known and may similarly be cited.

Presently whenever a magnetic core switching circuit of the general character referred to is to be realized, it is necessary to physically design in considerable detail each element of the circuit after the logical design has been determined. Thus, for example, the number of turns for each winding coupled to each core must be calculated in view of the core and circuit parameters and other requirements. When the circuit has been thus electrically decided upon, each core is then wound to the specifications set down. For relatively short, uncomplicated circuits this may, perhaps, be the most economical manner in which to proceed. However, when many magnetic core circuits, such as the logic circuits referred to hereinbefore, are to constitute component circuits of a computing or control system it becomes disadvantageous from the viewpoint of the expenditure of time and expense to design and construct each section of the circuit individually.

One obvious answer to this problem would be the provision of a standard core package, combinations of which could advantageously be wired together to synthesize any desired switching function. Such packages would include prewound magnetic cores and those additional circuit elements, such as diodes, as dictated by particular circuit requirements. Obviously, the number of windings on the packaged cores, the number of turns and size of the windings and the number of additional elements in each package would be such as to insure the broadest application of a standardized core package in a particular system. System considerations such as the character of the input current pulses available, their timing, the time limits within which the switching is to be accomplished, and the like, would then largely determine the design of a particular system package. A typical magnetic core package might include for example, a diode or diodes and a magnetic core or cores having a number of windings prewound thereon, among which windings a selection would be made to suit circuit requirements. Connections could then be made between appropriate terminals of the packages to construct the logic switching circuit.

Obviously, to simplify the standardized core package and thereby to render the package more universally applicable, the number of elements in each package should be advantageously maintained at a minimum. The advantage of using core packages would in turn then depend upon the complexity of, and the number of circuit elements required in, the switching circuits in which the packages would be used. It is also apparent that, aside from the consideration of the adaptability of the logic switching circuit to construction from standardized core packages, additional objectives in the design of an optimum logic circuit exist. Thus, it is obvious that for any given logic function the fewer the cores that it is necessary to switch and the fewer times those cores are switched to perform the particular required logic operation, the more efficiently the circuit will be operable from the viewpoint of power dissipation alone. Similarly, the less critical the timing of the input current pulses representing the variables introduced in the circuit, the greater will be the ease of providing the necessary input current pulses and the reliability of the logic operation. Thus also any reduction in the number of circuit elements to perform a given switching function is generally advantageous.

Not all magnetic core logic circuits, however, lend themselves with equal facility to the standardization represented by core packages, nor do these known circuits all represent the most efficient means of accomplishing logic functions when considered in terms of circuit element and power economy and input current pulse requirements and the like.

Accordingly, it is an object of this invention to provide an improved, more efficient magnetic core logic switching circuit employing fewer cores and other circuit elements.

It is another object of this invention to accomplish the synthesizing of logic functions by means of a magnetic core switching circuit advantageously adapted to a standardization of its elements.

These and other objects of this invention are realized in one specific illustrative embodiment thereof in which the logic operation is performed in an output network similar to that employed by Andrews in the patent cited. A number of parallel paths corresponding to the terms of a demonstration logic function are connected to the last of a plurality of series-connected activating windings. The activating windings are inductively coupled respectively to a plurality of magnetic cores. The cores are then settable in accordance with predetermined input variables to express the logic function to be synthesized. Here this function is to be understood as being an arbitrary demonstration function selected for purposes of describing the present invention.

The manner of interconnecting the magnetic core windings thus far described is substantially that described by M. Karnaugh in his Patents Nos. 2,719,773 and 2,719,961 both of October 4, 1955. In the circuit of the latter patent a highly advantageous current steering principle is applied. According to that principle, a voltage induced in an output winding of a switching core is of a polarity such as to cause the activating current which caused the core to switch its magnetic condition to be conducted through that output winding. In such an arrangement, with respect to the switching core, the output winding and the activating winding are connected in series and the activating current both switches the core when applied to the activating winding and energizes a load when conducted through the output winding. This principle can obviously be extended to a plurality of cores in a manner such that the activating current is steered through a path including an output winding or output windings of selected preset cores. In the former Karnaugh patent cited above, a closely related principle is applied. In the former case the output winding and the activating winding are also serially connected with the distinction, however, that the output winding is wound in a sense that a back voltage is induced in the output winding by the switching of the core. The activating current is thereby prevented from passing through the output winding and is shunted through an alternate circuit provided therefor. Both of these principles described by Karnaugh in the cited patents are also applied in the arrangement of the present invention.

According to a feature of this invention each of the parallel paths includes at least two output windings inductively coupled to associated cores. One and only one of the output windings, however, is wound in a forward direction, that is, in a direction such as to generate a voltage, responsive to the switching of its core, of a polarity to accomplish the current steering principle described above. Consequently, the only condition under which the activating current will be steered through a particular path is when the one forward wound winding in that path and only that winding is energized and none of the backward wound windings in that path are energized.

An important feature of this invention made possible by the novel interconnection of output windings described hereinbefore is the possible employment of a single core to perform a logic operation heretofore requiring two cores. Previously each variable has required a separate core to represent a specific relationship, for example, if both the variables $x_1$ and $x_1'$ occur in a sum expression of the function, two cores have been required to express these values. According to the present invention two cores may not be needed; by merely substituting a reverse output winding on a core corresponding to the variable $x_1$ for a forward output winding in the parallel path representing the term of the function in which the variable $x_1'$ occurs, the core normally corresponding to the value $x_1'$ may be eliminated.

According to another aspect of this invention it is still another feature thereof that the arrangement of at least one backward wound winding in each of the parallel paths as described above effectively prevents the generation of spurious output signals due to the shuttling of unswitched cores.

A complete understanding of this invention and of these and other features thereof may be gained from a consideration of the detailed description which follows when taken in conjunction with the accompanying drawing. The single figure of the drawing is a schematic representation of this invention depicted in the well-known mirror symbol notation described by M. Karnaugh in the Proceedings of the IRE, vol. 43, of May 1955, at page 570.

Referring now to the drawing, an illustrative circuit according to the principles of this invention is there shown to comprise a plurality of magnetic cores $10_1$ through $10_6$. The cores 10 of the character employed in this invention may be of the well-known ferrite type which are capable of remaining in either of two conditions of remanent magnetization to which driven by an applied magnetomotive force. Each of the cores 10 has inductively coupled thereto an input winding 11, an activating winding 12, and one or more output windings 13. Each of the activating windings 12 are serially connected and the winding 12 of the last core $10_6$ of the illustrative circuit shown is connected by means of a conductor 14 to one side of a plurality of parallel circuit branches $15_1$ through $15_4$. The other side of each of the parallel circuit branches $15_1$ through $15_4$ is connected through a unilateral conducting element, such as a diode 16, to a conductor 17. The latter conductor 17 connects in turn to a load 18.

Connected to the activating winding 12 of the first core $10_1$ of the switch is an activating current pulse source 19. A shunt circuit 20 to ground through another diode 16 also connects to the activating winding 12 of the last core $10_6$. Each of the input windings 11 of the cores $10_1$ through $10_6$ is individually connected by suitable conductor means to an input pulse source 20 representing a particular variable of the function to be synthesized. Thus the sources $20_1$ through $20_6$ connect respectively to the input windings 11 of the cores $10_1$ through $10_6$, the sources $20_1$ through $20_6$ representing, respectively, the variables $x_1$, $x_1'$, $x_2$, $x_2'$, $x_3$, and $x_4$ in accordance with the particular logic function to be synthesized in the present switch. Although the sources 20 are shown as original pulse sources it is to be understood that these sources may comprisee any information sources such as the outputs from other switching circuits.

In addition to the elements already described, each of the circuit branches 15 has included therein an output winding 13 of two or more of the cores 10. One and only one of the windings 13 in any particular circuit branch 15 is wound on its core 10 in a forward direction. In this description the term "forward direction" is understood to mean the direction in which the voltage induced in the output winding 13 of a branch 15 by the switching of the associated magnetic core 10 from a set to a reset magnetic condition will forward-bias the diode 16 included in that branch 15. In like manner, the term "backward direction" is understood to mean the direction in which the voltage induced in the output winding 13 of a branch 15 by the switching of the associated magnetic core 10 from a set to a reset magnetic condition will back-bias the diode 16 included in that branch 15.

All but one, then, of the output windings 13 in any of the branches 15 will be wound on the associated cores in a backward direction. It should here also be understood that as long as the foregoing limitation on the sense of the output windings 13 is observed, output windings 13 of any of the cores 10 may be included in any given one of the branches 15 and the one winding 13 being forward wound may be associated with any one of the cores 10 in accordance with the particular logic function to be performed. An arbitrary logic function has been selected to facilitate the description of this illustrative circuit and consists of four variables $x_1$, $x_2$, $x_3$, and $x_4$. The logic function selected is presented here in disjunctive form:

$$f(x_1, x_2, x_3, x_4)=x_1x_3'x_4+x_1x_2x_3x_4'+x_1'x_2x_3'+x_1'x_2'x_4.$$

The input variables will be introduced into the logic circuit from the input sources 20 and the output windings 13 are connected in the branches 15 in a manner such as to accomplish this illustrative logic operation.

Specifically, the circuit branch $15_1$ includes backward wound output windings 13 of the cores $10_2$ and $10_5$ and a forward wound output winding 13 of the core $10_6$. The circuit branch $15_2$ includes backward wound output windings 13 of the cores $10_2$, $10_4$, and $10_6$ and a forward wound output winding 13 of the core $10_5$. The circuit branch $15_3$ includes backward wound output windings 13 of the cores $10_4$ and $10_5$ and a forward wound output winding 13 of the core $10_2$. Finally, the circuit branch $15_4$ includes backward wound output windings 13 of the cores $10_1$ and $10_3$ and a forward wound output winding 13 of the core $10_6$. A plurality of current paths are thus provided for an applied activating current from the source 19. After passing the serially connected activating windings 12, the activating current may be conducted through the shunt conductor 20 to ground or through any of the circuit branches $15_1$ through $15_4$ and the conductor 17 to the load means 18. Which path the activating current ultimately seeks will depend upon whether or not the cores 10 have been selectively set by the input pulses corresponding to the variables of the logic function performed.

In the illustrative embodiment of this invention being described each of the circuit branches $15_1$ through $15_4$ corresponds to one of the four terms of the arbitrary function selected. The logic operation is begun when input pulses are applied to the input windings 11. The cores 10 associated with the particular input windings 11 pulsed will thus be set in the first phase of operation of the switch. In the second phase of operation an activating current pulse supplied from the source 19 is applied to the activating windings 12 with the result that the cores 10 set in the first phase of operation will be reset. The activating current will be conducted either along one of the circuit branches 15 to the load 18 or to ground along the conductor 20, depending respectively upon whether or not one of the branches 15 has included therein an output winding 13 wound in a forward direction, which output winding is the only output winding in that branch coupled to a core being switched by the activating current.

Thus, specifically considering the first term of the example function, $x_1x_3'x_4$, it will be assumed that the inputs representing these variables are energized in accordance with that relation. An input current pulse will accordingly be not applied to the input windings 11 of the cores $10_2$ and $10_5$ and will be applied to the input winding 11 of the core $10_6$. Only the latter core $10_6$ will, as a result, be set and when the activating current is applied from the source 19 only the core $10_6$ will be reset. A voltage will be induced in the forward wound winding 13 of the core $10_6$ as a result and, since the backward wound windings 13 of the cores $10_2$ and $10_5$ connected in series with the latter winding are unexcited, the induced voltage will be of a polarity to forward-bias the diode 16 in the circuit branch $15_1$ and the activating curent will follow the branch $15_1$ and the conductor 17 to the load 18.

In a similar manner, if the cores 10 are set in accordance with any of the other alternate terms of the example function, the activating curent will be conducted along one of the circuit branches $15_2$ through $15_4$. Thus, similarly the branch $15_4$ will be conductive and the activating current will be applied to the load 18 when the cores 10 are set in accordance with the last term $x_1'x_2'x_4$ of the example function. In accordance with that term the sources $20_1$ and $20_3$, supplying the variables $x_1$ and $x_2$, respectively, will not be energized and the source $20_6$ supplying the variable $x_4$ alone will be energized. As a result only the core $10_6$ will be set and only this core will be reset upon the application of the activating current in the second operative phase of the switch. During the latter phase only the forward wound output winding 13 in the branch $15_4$ is excited and the activating current is thus conducted through the circuit branch $15_4$ to the load 18.

The illustrative logic switching circuit thus applies an energizing current to the load means 18 responsive only to the introduction therein of the input variables in accordance with the conditions imposed by one of the terms of the example function. For all other conditions the activating current is shunted to ground along the conductor 20 and its diode 16 during the second operative phase of the switch. Obviously, since the logic function is performed only during the second operative phase of the switch the precise time during the first operative phase at which the pulses corresponding to the input variables are applied is not critical. It is further obvious that, since each of the non-conductive branches 15 during the second operative phase of the switch includes one or more backward wound output windings 13, no spurious or noise voltages induced in the output windings 13 by nonswitched or shuttled cores can affect the load means 18.

It is to be understood that although an illustrative logic switching circuit has been described which is capable of synthesizing the illustrative logic function stated, any other function may be performed by a circuit according to this invention. Thus it is only necessary to effect the proper interconnection of output windings on the several cores to perform a desired logic operation. When a logic function represented by an expression which has either fewer or more terms is to be performed, the illustrative circuit herein described may be modified by simply reducing or adding to the number of cores 10 and circuit branches 15. Other modifications in the illustrative circuit may similarly be made. Thus an examination of the drawing suggests that an obvious saving of one of the output windings 13 of the core $10_2$ may be realized by establishing the connection between the branches $15_1$ and $15_2$ following core $10_2$ and disconnecting the branch $15_2$ at the end opposite the load $c$. This modification corresponds to the identity of two terms of the example function, that is, $$x_1x_3'x_4+x_1x_2x_3x_4'=x_1(x_3'x_4+x_2x_3x_4')$$

Similar modification to combine the output windings 13 in series-parallel fashion may be made wherever the function to be synthesized permits. However, the limitation in accordance with this invention must be met in any such modification, that is, each branch 15 must continue to have one and only one forward wound output winding 13, included therein.

It is further to be understood that the circuit arrangement herein described is but illustrative of the applications of the principles of this invention. Accordingly numerous other arrangements may be devised by those skilled in the art, without departing from the spirit and scope of this invention.

What is claimed is:

1. An electrical circuit comprising a plurality of magnetic cores, a plurality of windings inductively coupled to each of said cores, said windings comprising an input, an activating, and at least one output winding, means for selectively applying setting currents to particular ones of said input windings, circuit means for serially connecting said activating windings, means for applying an activating current to said circuit means, unidirectional current means; a plurality of parallel current paths, said paths being connected to said circuit means and each of said current paths including at least two of said output windings and one of said unidirectional current means, one of said last-mentioned output windings being in a sense opposite to that of the others of said last-mentioned output windings and load means connected to said current paths.

2. An electrical circuit comprising a plurality of magnetic cores, an input, an activating, and at least one output winding inductively coupled to each of said cores, a plurality of unidirectional current means, means for applying current pulses to said input windings for setting particular ones of said cores, circuit means for serially connecting said activating windings, means for applying an activating current pulse to said circuit means for switching said particular ones of said cores, a plurality of parallel current paths, each of said paths connected at one side to the last of said activating windings and including output windings of predetermined ones of said cores and one of said unidirectional current means, only one of said last-mentioned output windings being wound in a particular sense, and load means connected to the other side of each of said parallel paths.

3. An electrical circuit comprising a plurality of magnetic cores, an input, an activating, and at least one output winding inductively coupled to each of said cores, a plurality of unidirectional current means, means for applying current pulses to said input windings for setting particular ones of said cores, circuit means for serially connecting said activating windings, means including a current pulse source for applying an activating current pulse to said circuit means, a network connected to the last of said activating windings, said network comprising said plurality of unidirectional current means and said output windings interconnected such that an output winding of each of said cores is connected to at least one output winding of another core and one of said plurality of unidirectional current means, at least one of said last-mentioned output windings being wound in a particular direction opposite the direction of at least one of the others of said output windings connected thereto, circuit means for shunting said network, and load means connected to said network.

4. An electrical circuit comprising a plurality of magnetic cores, windings inductively coupled to each of said cores, said windings comprising an input winding, an activating winding, and at least one output winding, means for selectively applying setting current pulses to particular ones of said input windings, first circuit means for serially connecting said activating windings, means including a pulse source connected to one side of said first circuit means for applying an activating current pulse to said activating windings, a plurality of circuit branches connected to the other side of said first circuit means, each of said branches including an output winding wound in one direction, at least one output winding wound in the opposite direction, and a unilateral conducting element; second circuit means including a unilateral conducting element also connected to said other side of said first circuit means for shunting said circuit branches, and load means connected to each of said circuit branches.

5. An electrical circuit according to claim 4, in which said unilateral conducting elements are poled so as to permit the passage of only said activating current pulse.

6. An electrical circuit comprising a plurality of magnetic cores, each of said cores having an input winding, an activating winding, and at least one output winding inductively coupled thereto, circuit means having a plurality of branches, said circuit means serially connecting said activating windings, one of said branches including a unilateral conducting element, and the others of said branches each including at least two of said output windings and a unilateral conducting element, one of said last-mentioned output windings only being wound on its associated core in one sense, means including said input windings for determining the magnetic condiiton of particular ones of said cores, and means for applying an activating current to said circuit means.

7. An electrical circuit according to claim 6 also comprising a load means connected to said others of said branches.

8. An electrical circuit comprising a plurality of magnetic cores, an input, an activating, and at least one output winding inductively coupled to each of said cores, first means for serially connecting said activating windings, second means for connecting groups of said output windings in series, one of said output windings in each of said groups being connected in a sense opposite to the sense of the other output windings in that one of said groups, and means for connecting said first means to said second means.

9. An electrical circuit including a plurality of magnetic cores each having wound thereon input, activating, and output windings, means for applying pulses to said input windings selectively to set said cores, circuit means for serially connecting said activating windings, means for applying an activating pulse to said circuit means, unidirectional current means, and network means connecting said output windings in a plurality of parallel paths, said network means being connected to the last of said series connected activating windings and each of said parallel paths including one of said unidirectional current means and one and only one output winding wound on a magnetic core so that a forward electromotive force is induced therein on switching of said core by said activating pulse and at least one other output winding of another core wound on said other core so that a reverse electromotive force is induced therein on switching of said other core by said activating pulse.

10. An electrical circuit comprising a plurality of magnetic cores, a plurality of windings inductively coupled to each of said cores, said plurality of windings including an input, an activating, and at least one output winding, a plurality of unidirectional current means, means for selectively applying setting current pulses to said input windings to set particular ones of said cores, first circuit means for serially connecting said activating windings, means including a current source connected to one side of said first circuit means for applying an activating current pulse to said activating windings to switch the set cores of said plurality of cores, a plurality of circuit branches connected to the other side of said first circuit means, each of said branches including one of said unidirectional current means and one output winding wound on a core in a sense such that a forward electromotive force is induced therein on the switching of said core and at least one output winding wound on another core in a sense such that a backward electromotive force is induced therein on the switching of said other core, second circuit means also connected to said other side of said first circuit means for shunting said circuit branches, and load means connected to each of said circuit branches.

11. An electrical circuit comprising a plurality of magnetic cores, each of said cores having inductively coupled thereto an input winding, an activating winding, and at least one output winding, means for selectively applying setting current pulses to said input windings to set particular ones of said cores, first circuit means for serially connecting said activating windings, means including a pulse source connected to one side of said first circuit means for applying an activating current pulse to said activating windings to switch set cores of said plurality of cores, a plurality of circuit branches connected to the other side of said first circuit means, each of said branches including a diode, one and only one output winding wound on a core in a sense such as to forward-bias said diode on the switching of said core, and at least one output winding wound on another core in a sense such as to back-bias said diode on the switching of said other core; second circuit means including a diode also connected to said other side of said first circuit means for shunting said circuit branches, and load means connected to said circuit branches.

12. An electrical circuit comprising a plurality of magnetic cores, an input, an activating, and at least one output winding inductively coupled to each of said cores, unidirectional circuit means, means for applying current pulses to said input windings for setting particular ones of said cores, means for applying an activating current pulse simultaneously to each of said activating windings, a network comprising said output windings interconnected such that an output winding of each of said cores is connected to at least one output winding of another core and one of said unidirectional circuit means, only one of said last-mentioned output windings being wound in one particular direction, the others of said last-mentioned output windings being wound in the opposite direction, means for applying a current pulse to said network simultaneously with the application of said activating current pulse, circuit means for shunting said network, and load means connected to said network.

13. An electrical circuit comprising a plurality of magnetic cores, windings inductively coupled to each of said cores, said windings comprising an input winding, an activating winding, and at least one output winding, means for selectively applying current pulses to said input windings to set particular ones of said plurality of cores, means for applying an activating current pulse simultaneously to said activating windings, an output circuit comprising a plurality of branches, each of said branches including an output winding wound in one direction, at least one output winding wound in the opposite direction, and a unilateral conducting element; means for applying a current pulse to said output circuit simultaneously with the application of said activating current pulse to said activating windings, circuit means including a unilateral conducting element for shunting said branches, and load means connected to each of said branches.

14. An electrical circuit including a plurality of magnetic cores each having wound thereon an input, an activating, and at least one output winding, a plurality of unilateral conducting elements, means for applying pulses to said input windings selectively to set particular ones of said cores, means for applying an activating pulse simultaneously to said activating windings to switch said particular cores, network means connecting said output windings in a plurality of parallel paths, each of said parallel paths including one of said unilateral conducting elements and one and only one output winding wound on a magnetic core so that a forward electromotive force is induced therein on switching of said core by said activating pulse and at least one other output winding of another core wound on said other core so that a reverse electromotive force is induced therein on switching of said other core by said activating pulse, means for applying a current pulse to said network means simultaneously with the application of said activating pulse to said activating windings, means for shunting said network, and load means connected to said parallel paths.

15. An electrical circuit comprising a plurality of magnetic cores, an input, an activating, and at least one output winding inductively coupled to each of said cores, means for applying current pulses to said input windings for setting particular ones of said cores, circuit means for serially connecting said activating windings, means including a current pulse source for applying an activating current pulse to said circuit means, a network connected to the last of said activating windings, said network comprising said output windings interconnected such that an output winding of each of said cores is connected to at least one output winding of another core, one of said last-mentioned output windings being wound in a particular direction opposite the direction of at least one of the others of said output windings connected thereto, circuit means for shunting said network, load means connected to said network, and unilateral conducting elements connected in said last-mentioned circuit means and to each of said ones of said last-mentioned output windings.

References Cited in the file of this patent

UNITED STATES PATENTS

| | | |
|---|---|---|
| 2,719,773 | Karnaugh | Oct. 4, 1955 |
| 2,719,961 | Karnaugh | Oct. 4, 1955 |
| 2,776,380 | Andrews | Jan. 1, 1957 |
| 2,781,504 | Canepa | Feb. 12, 1957 |